United States Patent [19]

Stephen

[11] 3,891,673

[45] June 24, 1975

[54] HINDERED PHENOLIC S-TRITHIANE 1,1,3,3,5,5-HEXAOXIDES

[75] Inventor: John F. Stephen, New City, N.Y.

[73] Assignee: Ciba-Geigy Corporation, Ardsley, N.Y.

[22] Filed: May 23, 1974

[21] Appl. No.: 472,557

[52] U.S. Cl.. 260/327 T; 252/301.3 W; 260/45.8 R
[51] Int. Cl............................................. C07d 77/02
[58] Field of Search ................................ 260/327 T

[56] References Cited

UNITED STATES PATENTS 3,058,952  10/1962  Dexheimer et al. .............. 260/45.8
3,171,778  3/1965  Slezak et al.......................... 167/33

Primary Examiner—Jiles Henry R.
Assistant Examiner—C. M. S. Jaisle
Attorney, Agent, or Firm—Luther A. R. Hall; Nestor W. Shust

[57] ABSTRACT

Compounds having the formula I

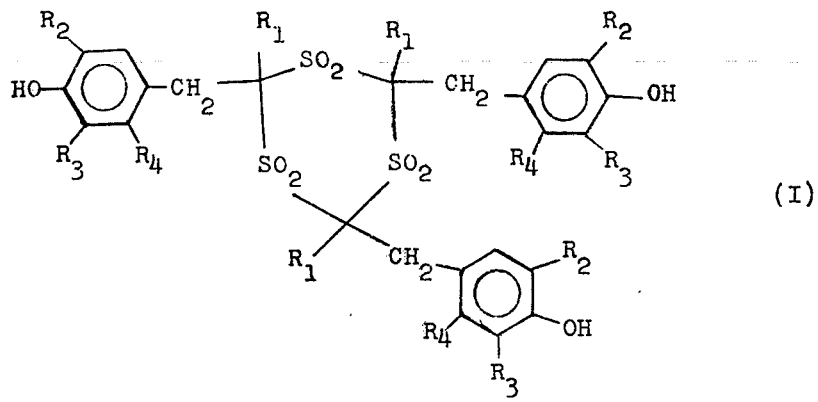

(I)

wherein
$R_1$ is independently hydrogen or alkyl of 1 to 18 carbon atoms,
$R_2$ and $R_3$ are the same or different lower alkyl groups of from 1 to 8 carbon atoms, cycloalkyl of from 5 to 6 carbon atoms or one of $R_2$ and $R_3$ is hydrogen, and
$R_4$ is hydrogen or lower alkyl of from 1 to 6 carbon atoms and providing that when $R_4$ is alkyl, $R_1$ is hydrogen, are good thermal and oxidative stabilizers for synthetic polymers. These compounds are prepared by reacting the corresponding alkylated 4-hydroxybenzyl tertiary amine with s-trithiane 1,1,3,3,5,5-hexaoxide.

6 Claims, No Drawings

HINDERED PHENOLIC S-TRITHIANE 1,1,3,3,5,5-HEXAOXIDES

DETAILED DISCLOSURE

This invention pertains to hindered phenolic s-trithiane 1,1,3,3,5,5-hesaoxides and to organic materials normally subject to oxidative and thermal degradation stabilized therewith. The compounds of this invention can be represented by the formula I

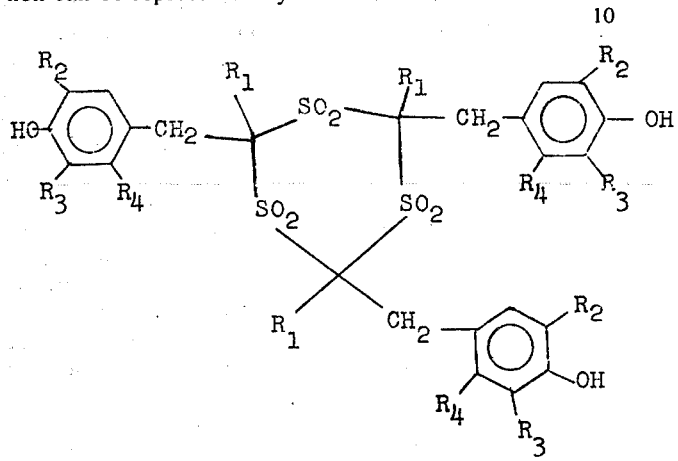

(I)

wherein
R$_1$ is independently hydrogen or alkyl of 1 to 18 carbon atoms,
R$_2$ and R$_3$ are the same or different alkyl groups of from 1 to 8 carbon atoms, cycloalkyl of 5 to 6 carbon atoms or one of R$_2$ and R$_3$ is hydrogen, and
R$_4$ is hydrogen or lower alkyl of 1 to 6 carbon atoms and providing that when R$_4$ is alkyl, R$_1$ is hydrogen.

The R$_1$ group can be hydrogen or any straight chain alkyl having 1 to 18 carbon atoms, such as methyl, ethyl, n-butyl, n-octyl, n-dodecyl and n-octadecyl. Preferably this group is hydrogen or lower alkyl of 1 to 6 carbon atoms. Most preferably R$_1$ is hydrogen or methyl.

The R$_2$ and R$_3$ groups can be any straight or branched chain alkyl group having 1 to 8 carbon atoms, such as methyl, ethyl, isopropyl, n-butyl, tert-butyl, n-hexyl and tert-octyl, or a cycloalkyl group of 5 and 6 carbon atoms, such as cyclopentyl and cyclohexyl. Preferably R$_2$ and R$_3$ are lower alkyl having 1 to 4 carbon atoms, such groups being methyl, isopropyl and tert-butyl. Most preferably R$_2$ is tert-butyl and R$_3$ is methyl or tert-butyl.

The R$_4$ group can be hydrogen or lower alkyl of 1 to 6 carbon atoms such as methyl, ethyl, isopropyl, n-propyl, n-butyl and n-hexyl. When R$_4$ is alkyl, R$_1$ is hydrogen. Preferably R$_4$ is hydrogen or methyl.

Compounds of the invention where R$_1$ is hydrogen are conveniently made by reacting the corresponding alkylated 4-hydroxybenzyl tertiary amine of the formula II

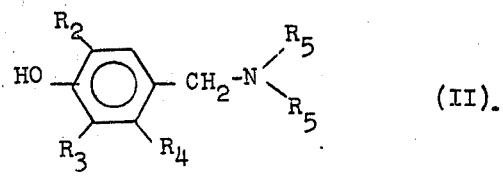

(II)

where R$_2$, R$_3$ and R$_4$ are as defined previously and R$_5$ is lower alkyl, preferably methyl, with s-trithiane 1,1,3,3,5,5,-hexaoxide III

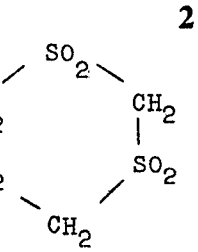

(III)

in N,N-dimethylformamide solvent, and have the formula IV.

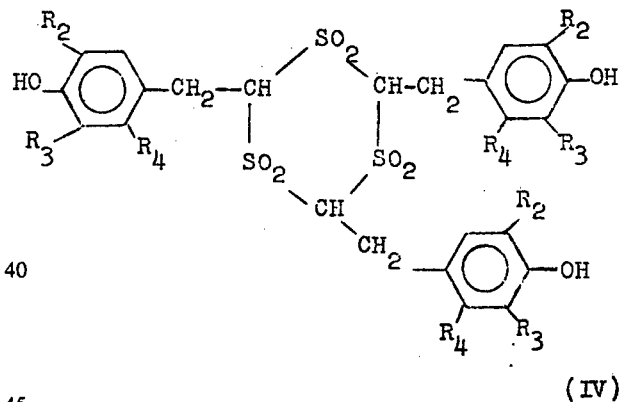

(IV)

Alternatively, alkylation of s-trithiane 1,1,3,3,5,5-hexaoxide with the appropriately alkylated 4-hydroxybenzyl halide (preferably chloride) or alkylated 4-hydroxybenzyl N,N-dialkyldithiocarbamate in the presence of a suitable alkali metal hydroxide or alkoxide leads to the corresponding compounds of formula IV.

Compounds of the invention where R$_1$ is alkyl are made by reacting compounds of formula IV with alkyl derivatives of formula V $$R_6 - X$$

(V)

where R$_6$ is alkyl of 1 to 18 carbon atoms, and X is a halogen atom, such as iodine, bromine or chlorine, in alcohol solution using an alkali metal alkoxide to catalyze the reaction, and have the formula I.

Alternatively, when R$_1$ is methyl, dimethyl sulfate can be used to prepare compounds of formula I from compounds of formula IV under alkaline reaction conditions.

(3,5-Di-tert-butyl-4-hydroxybenzyl)dimethylamine is commercially available. (3-Methyl-5-tert-buty-4-hydroxybenzyl)dimethylamine can be prepared according to the teachings of U.S. Pat. No. 2,962,531.

s-Trithiane 1,1,3,3,5,5-hexaoxide can be prepared from commercially available s-trithiane in two steps according to the method described in French Pat. No. 1,376,209.

Listed below are illustrative examples of the compounds of this invention.

2,4,6-trimethyl-2,4,6-tris(3'-methyl-5'-tert-butyl-4'-hydroxybenzyl)-s-trithiane 1,1,3,3,5,5-hexaoxide 2,4,6-tris(3',5'-di-isopropyl-4'-hydroxybenzyl)-s-trithiane 1,1,3,3,5,5-hexaoxide 2,4,6-trimethyl-2,4,6-tris(3',5'-di-isopropyl-4'-hydroxybenzyl)-s-trithiane 1,1,3,3,5,5-hexaoxide 2,4,6-tris(3',5'-dimethyl-4'-hydroxybenzyl)-s-trithiane 1,1,3,3,5,5-hexaoxide 2-n-octadecyl-2,4,6-tris(3',5'-di-tert-butyl-4'-hydroxybenzyl)-s-trithiane 1,1,3,3,5,5-hexaoxide 2,4,6-trimethyl-2,4,6-tris(3',5'-dimethyl-4'-hydroxybenzyl)-s-trithiane 1,1,3,3,5,5-hexaoxide 2-n-buty-2,4,6-tris(3'-methyl-5'-tert-butyl-4'-hydroxybenzyl)-s-trithiane 1,1,3,3,5,5-hexaoxide 2-n-octyl-2,4,6-tris(3',5'-di-tert-butyl-4'-hydroxybenzyl)-s-trithiane 1,1,3,3,5,5-hexaoxide 2-methyl-2,4,6-tris(3',5'-di-tert-butyl-4'-hydroxybenzyl)-s-trithiane 1,1,3,3,5,5-hexaoxide 2,4,6-tris(2'-methyl-5'-tert-butyl-4'-hydroxybenzyl)-s-trithiane 1,1,3,3,5,5-hexaoxide 2-n-butyl-2,4,6-tris(3'-methyl-5'-tert-octyl-4'-hydroxybenzyl)-s-trithiane 1,1,3,3,5,5-hexaoxide 2,4,6-tris(2',3'-dimethyl-5'-tert-butyl-4'-hydroxybenzyl)-s-trithiane 1,1,3,3,5,5-hexaoxide 2,4,6-tris(2'-n-hexyl-5'-tert-butyl-4'-hydroxybenzyl)-s-trithiane 1,1,3,3,5,5-hexaoxide 2,4,6-tris(3'-cyclohexyl-5'-methyl-4'-hydroxybenzyl)-s-trithian 1,1,3,3,5,5-hexaoxide The compounds of this invention are stabilizers of organic material normally subject to thermal, oxidative or actinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as high and low density polyethylene, cross-linked polyethylene, polypropylene, poly(4-methyl-pentene-1 and the like, including copolymers of α-olefins; such as ethylene/propylene copolymers, and the like; dienes such as polybutadiene, polyisoprene, and the like, including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepared from bisphenol-A and phosgene; polyacetals such as polyethylene terephthalate polyacetal; polystyrene, polyethyleneoxide; polyacrylics such as polyacrylonitrile; polyphenyleneoxides such as those prepared from 2,6-dimethylphenol and the like; and copolymers such as those of polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(1,2-ethylene)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene glycols, e.g., β-methoxyethyleneglycol, methoxytriethyleneglycol, triethylene glycol, octaethylene-glycol, dibutyleneglycol, dipropyleneglycol and the like.

The compounds of this invention are particularly useful as thermal antioxidants, especially for the protection of polyolefins, for instance, polyethylene, polypropylene, poly(butene-1), poly(pentene-1), poly(3-methylbutene-1), poly(4-methylpentene-1), various ethylene-propylene and ethylene-propylene diene copolymers and the like.

In general, the stabilizers of this invention are employed from about 0.01 to about 5% by weight of the stabilized composition, although this will vary with the particular substrate and application. An advantageous range is from about 0.05 to about 2% and especially 0.1 to about 1%.

For addition to polymeric substrates, the stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the polymer against degradation during such processing at the high temperature generally encountered. The stabilizers can also be dissolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

These compounds can also be used in combination with other additives such as antioxidants, sulfur-containing esters such as distearyl β-thiodipropionate (DSTDP), dilauryl β-thiodipropionate (DLTDP) in an amount of from 0.01 to 2% by weight of the organic material, and the like, pourpoint depressants, corrosion and rust inhibitors, dispersing agents, emulsifiers, antifoaming agents, fillers such as glass or other fibers, carbon black, accelerators and the other chemicals used in rubber compounding, plasticizers, color stabilizers, di- and tri-alkyl- and alkylphenyl-phosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are particularly useful in combination with the stabilizers of this invention:

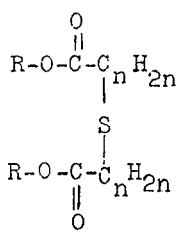

wherein R is an alkyl group having from 6 to 24 carbon atoms; and n is an integer from 1 to 6. Especially useful compounds of this type are dilauryl β-thiodipropionate and distearyl β-thiodipropionate. The above co-stabilizers are used in the amount of from 0.01 to 2% by weight of the organic material, and preferably from 0.1 to 1%.

In addition to the above noted additives that can be employed in combination with the compounds of this invention, it is often especially advantageous to employ also light stabilizers. The light stabilizers are used in the amount of from 0.01 to 5% by weight of the organic material, and preferably from 0.1 to 1%. Illustrative examples of light stabilizers are listed below.

UV-Absorbers and light protection agents 2-(2'-hydroxyphenyl)-benztriazoles, such as, for example, the 5'-methyl-, 3',5'-di-tert.-butyl-,5'-tert.-butyl-, 5'(1,1,3,3-tetramethyl-butyl)-,5-chloro-3',5'-di-tert.-butyl-, 5-chloro-3'-tert.-butyl-5'-methyl-, 3'-sec.-butyl-5'-tert.-butyl-, 3'- α-methyl-benzyl -5'-methyl-, 3'- α-methylbenzyl -5'-methyl-5-chloro-, 4'-hydroxy-, 4'-methoxy-, 4'-octoxy-, 3',5'-di-tert.-amyl-, 3'-methyl-5'-carbomethoxyethyl- or 5-chloro-3',5'-di-tert.-amyl-derivative.

2,4-bis-(2'-hydroxyphenyl)-6-alkyl-s-triazines, such as, for example, the 6-ethyl-, 6-undecyl- or 6-heptadecyl-derivative.

2-hydroxy-benzophenones, such as, for example, the 4-hydroxy-, 4-methoxy-, 4-octoxy-, 4-decyloxy-, 4-dodecyloxy-, 4-benzyloxy-, 4,2',4'-trihydroxy- or 2'-hydroxy-4,4'-dimethoxy-derivative.

1,3-bis-(2'-hydroxy-benzoyl)-benzenes, such as, for example, 1,3-bis-(2'-hydroxy-4'-hexyloxy-benzoyl)-benzene, 1,3-bis-(2'-hydroxy-4'-octoxy-benzoyl)-benzene and 1,3-bis-(2'-hydroxy-4'-dodecyloxy-benzoyl)-benzene.

Esters of optionally substituted benzoic acids, such as, for example, phenyl salicylate, octylphenyl salicylate, di-benzoylresorcinol, bis-(4-tert.-butylbenzoyl)-resorcinol, benzoyl-resorcinol, 3,5-di-tert.-butyl-4-hydroxybenzoic acid 2,4-di-tert.-butyl-phenyl ester, octadecyl ester or 2-methyl-4,6-di-tert.-butylphenyl ester.

Acrylates, such as, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methyl-indoline.

Nickel compounds, such as, for example, nickel complexes of 2,2'-thio-bis-4-(1,1,3,3-tetramethylbutyl)-phenol such as the 1:1 and 1:2 complex, optionally with other ligands such as n-butylamine, triethanolamine or N-cyclohexyl-diethanolamine; nickel complexes of bis-2-hydroxy-4-(1,1,3,3-tetramethylbutyl)-phenyl - sulphone, such as the 2:1 complex, optionally with other ligands such as ethyl-caproic acid; nickel dibutyldithiocarbamate, nickel salts of 4-hydroxy-3,5-di-tert.-butylbenzylphosphonic acid monoalkyl esters, such as the methyl, ethyl or butyl ester, the nickel complex of (2-hydroxy-4-methylphenyl)-undecyl-ketonoxime and nickel 3,5-di-tert.-butyl-4-hydroxybenzoate.

Oxalic acid diamides, such as, for example, 4,4'-dioctyloxyoxanilide, 2,2'-dioctyloxy-5,5'-di-tert.-butyloxanilide, 2,2'-di-dodecyloxy-5,5'-di-tert.-butyl oxanilide, 2-ethoxy-5-tertiarybutyl-2'-ethyl-oxanilide, 2-ethoxy-2'-ethyl-oxanilide, N,N'-bis-(3-dimethylaminopropyl) oxalamide, mixtures of o- and p-methoxy and o- and p-ethoxy-di-substituted oxanilides and mixtures of 2-ethoxy-5-tert.-butyl 2'-ethyloxanilide with 2-ethoxy-2'-ethyl-5,4'-di-tert.-butyloxanilide. Sterically hindered amines, such as, for example 4-benzoyloxy-2,2,6,6-tetramethylpiperidine, 4-stearoyloxy 2,2,6,6-tetramethylpiperidine, bis-(2,2,6,6-tetramethylpiperidyl) sebacate and 3-n-octyl-7,7,9,9-tetramethyl-1,3-triaza-spiro[4,5]decane-2,4-dione.

Especially useful compounds of this type are 2(2'-hydroxy-3',5'-di-tert-butylphenyl)-5-chlorobenzotriazole,2-hydroxy-4-methoxy-b 5-sulfobenzophenone trihydrate, 2-hydroxy-4-n-octoxybenzophenone, [2,2'-thiobis-(4-t-octylphenolate)]-n-butyl-amine nickel II, p-octylphenylsalicylate, 2,2'-dihydroxy-4,4'-dimethoxybenzophenone, and 2[2'-hydroxy-5'-methylphenyl]-benzotriazole.

The following examples further illustrate the present invention without introducing any limitations.

EXAMPLE 1

2,4,6-tris(3',5'-di-tert-butyl-4'-hydroxybenzyl)-s-trithiane 1,1,3,3,5,5-hexaoxide In a nitrogen atmosphere, a stirred mixture of 11.7 grams (0.05 mole) of s-trithiane 1,1,3,3,5,5-hexaoxide and 41.4 grams (0.157 mole) of (3,5-tert-butyl-4-hydroxybenzyl)dimethylamine in 200 ml of dry dimethylformamide was heated at 80°–85°C for 6 hours. After cooling, the mixture was poured into water and the semisolid precipitate which formed was extracted with ether. The ether extract was washed with water, with dilute hydrochloric acid, again with water and dried. On standing overnight 17.0 grams of product precipitated and was collected by filtration. Dilution of the filtrate with petroleum ether yielded an additional 14.0 grams of product. The crude product was recrystallized from acetonitrile, yielding white crystals melting at 307°–308°C (with decomposition). (Stabilizer No. 1)

In like manner, by substituting an equivalent amount of (3,5-diisopropyl-4-hydroxybenzyl)dimethylamine for (3,5-di-tert-butyl-4-hydroxybenzyl)dimethylamine, the product 2,4,6-tris(3',5'-diisopropyl-4'-hydroxybenzyl)-s-trithiane 1,1,3,3,5,5-hexaoxide is obtained.

In like manner, by substituting an equivalent amount of (2,3-dimethyl-5-tert-butyl-4-hydroxybenzyl) dimethylamine for (3,5-di-tert-butyl-4-hydroxybenzyl) dimethylamine, the product 2,4,6-tris(2',3'-dimethyl-5-tert-butyl-4'-hydroxybenzyl)-s-trithiane 1,1,3,3,5,5-hexaoxide is obtained.

EXAMPLE 2

2,4,6-tris(3'-methyl-5'-tert-butyl-4'-hydroxybenzyl)-s-trithiane 1,1,3,3,5,5-hexaoxide This compound was made in substantially the same manner as described in Example 1 by substituting (3-methyl-5-tert-butyl-4-hydroxybenzyl)dimethylamine for (3,5-di-tert-butyl-4-hydroxybenzyl)dimethylamine. Evaporation of the dired ether extract under reduced pressure gave a solid residue which was triturated with petroleum ether. The resulting product was twice recrystallized from aqueous ethanol to give white crystals melting at 260°–262°C (with decomposition). (Stabilizer No. 2).

In like manner, by substituting an equivalent amount of (3,5-dimethyl-4-hydroxybenzyl)dimethylamine for (3,5-di-tert-butyl-4-hydroxybenzyl)dimethylamine, the product 2,4,6-tris(3',5'-dimethyl-4'-hydroxybenzyl)-s-trithiane 1,1,3,3,5,5-hexaoxide is obtained.

EXAMPLE 3

2,4,6-trimethyl-2,4,6-tris(3',5'-di-tert-butyl-4'-hydroxybenzyl)-s-trithiane 1,1,3,3,5,5-hexaoxide In a nitrogen atmosphere, 26.7 grams (0.03 mole) of 2,4,6-tris(3',5'-di-tert-butyl-4-hydroxybenzyl)-s-trithiane 1,1,3,3,5,5-hexaoxide was added in portions to a stirred solution of 5.38 grams (0.1 mole) of sodium methoxide in 150 ml of methanol. A solution of 25.6 grams (0.18 mole) of methyl iodide in 50 ml of methanol was then added dropwise. After the addition was complete, the mixture was heated at 55°C for 1.5 hours. A solid precipitated from the mixture and was isolated by filtration. The crude product was recrystallized three times from aqueous acetone to give 11.4 grams of the desired product as white crystals melting at 292°–293°C (with decomposition). (Stabilizer No. 3).

In like manner, by substituting 2,4,6-tris (3'-methyl-5'-tert-butyl-5'-hydroxybenzyl)-s-trithiane 1,1,3,3,5,5-hexaoxide for 2,4,6-tris(3',5'-di-tert-butyl-4-hydroxybenzyl)-s-trithiane 1,1,3,3,5,5-hexaoxide, the product 2,4,6-trimethyl-2,4,6-tris(3'-methyl-5'-tert-butyl-4'-hydroxybenzyl)-s-trithiane 1,1,3,3,5,5-hexaoxide is obtained.

EXAMPLE 4

If in Example 3, the methyl iodide is replaced by one third equivalent of n-octadecyl bromide, the product 2-n-octadecyl-2,4,6-tris(3',5'-di-tert-butyl-4'-hydroxybenzyl)-s-trithiane 1,1,3,3,5,5-hexaoxide is obtained.

In like manner, by substituting n-octyl bromide for n-octadecyl bromide, the product 2-n-octyl-2,4,6-tris(3',5'-di-tert-butyl-4'-hydroxybenzyl)-s-trithiane 1,1,3,3,5,5-hexaoxide is obtained.

EXAMPLE 5

A batch of unstabilized polypropylene powder (Hercules Profax 6501) was thoroughly blended with 0.2% by weight of various compounds of this invention. The blended materials are then milled on a two-roll mill at 182°C for 5 minutes after which time the stabilized polypropylene was sheeted from the mill and allowed to cool.

The milled polypropylene sheets were then cut into pieces and pressed for 5 minutes on a hydraulic press at 218°C and 19.25 Kg/cm² pressure. The resulting plaques of 0.635 mm thickness were tested for resistance to accelerated aging in a forced draft oven at 150°C. When the plaques showed the first signs of decomposition (eg., cracking or brown edges), they were considered to have failed. The results are set out in Table 1.

Table 1

| Stabilizer No. | Oven Aging at 150°C Hours to Failure |
|---|---|
| 1 | 90 |
| 2 | 120 |
| 3 | 115 |
| Unstabilized Polypropylene | 3 |

EXAMPLE 6

Test specimens were prepared exactly as described in Example 5 except that the stabilized polypropylene contained 0.2% by weight of the various compounds of this invention and 0.5% by weight of 2(2'-hydroxy-3',5'-di-tert-butylphenyl)-5-chlorobenzotriazole as a co-stabilizer. Results of accelerated aging tests in a forced draft oven at 150°C are shown in Table 2.

Table 2

| Stabilizer No. (Plus Co-Stabilizer) | Oven Aging at 150°C Hours to Failure |
|---|---|
| 1 | 50 |
| 2 | 170 |
| 3 | 165 |
| Unstabilized Polypropylene | 3 |

EXAMPLE 7

Test specimens were prepared exactly as described in Example 5 except that the stabilized polypropylene contained 0.1% by weight of various compounds of this invention and 0.3% by weight of distearyl thiodipropionate (DSTDP) as a co-stabilizer. Results of accelerated aging tests in a forced draft oven at 150°C are shown on Table 3.

Table 3

| Stabilizer No. (Plus Co-Stabilizer) | Oven Aging at 150°C Hours to Failure |
|---|---|
| 1 | 740 |
| 2 | 1525 |
| 3 | 1765 |
| Unstabilized Polypropylene | 3 |
| With DSTDP Only | 100 |

EXAMPLE 8

Test specimens were prepared exactly as those described in Example 6 except that the milled polypropylene sheets were cut into pieces and pressed for 3 minutes on a hydraulic press at 281°C and 19.25 Kg/cm² pressure. The resulting sheet of 0.127 mm thickness was tested in a fluorescent sunlight black light environment with the development of carbonyl absorption in the infrared spectrum at the 585 millimicron wavelength being the measure of stabilization protection afforded by the stabilizers present in the polypropylene. Failure was taken as the hours required to cause the carbonyl absorption to reach a value of 0.5. Such a value correlates with the reduction of physical properties of the polypropylene pellicle to unacceptable levels. The results are set out in Table 4.

Table 4

| Stabilizer No. (Plus Co-Stabilizer) | Flourescent Sunlight Black Light Test Hours to Failure (0.5 Carbonyl Absorption) |
|---|---|
| 1 | 1230 |
| 2 | 1110 |
| 3 | 800 |
| Unstabilized Polypropylene | 225 |

EXAMPLE 9

Pellets (500 g) of unstabilized nylon-6,6 (Zytel 101, DuPont) are placed in a Kitchen Aid Mixer. With mixing a solution of 0.5% (based on the weight of nylon) of 2,4,6-trimethyl-2,4,6-tris(3',5'-di-tert-butyl-4'-hydroxybenzyl)-s-trithiane 1,1,3,3,5,5-hexaoxide in 20 ml of methylene chloride is added slowly. Sodium hypophosphite (0.5 gm 0.1%) is dissolved in 20 ml of water and added slowly with mixing to the nylon pellets after the antioxidant solution has been added and most of the methylene chloride has evaporated. The stabilized pellets are dried at 80°C at <1 mm Hg. for 4 hours.

The polyamide formulation is extruded at 315.6°C through at 0.635 cm die into a rod which is water cooled and chopped into pellets. A 1.905 cm Brabender extruder, equipped with a nylon screw, is used. The pellets are dried at 800°C at <1 mm for 4 hours.

The dried pellets are compression molded into 0.127 mm thick film by pressing at 290°C for 4 minutes at 57.75 Kg/cm². The films are oven aged at 150°C in a forced draft oven and samples are removed periodically. The specific viscosity of the samples are determined using a 1% formic acid solution at 25°C. The sample stabilized with the above noted stabilizer required longer aging time to reduce its viscosity by one-half than the unstabilized sample.

EXAMPLE 10

Unstabilized high impact polystyrene resin is dry blended with 0.01% by weight of the resin of 2,4,6-tris(3',5'-di-tert-butyl-4'-hydroxybenzyl)-s-trithiane 1,1,3,3,5,5-hexaoxide. The resin is then extrusion compounded on a 2.54 cm 24/1=L/D extruder with melt temperature 260°C and pressed for 7 minutes at a temperature of 163°C and a pressure of 140 Kg/cm² into a sheet of uniform thickness of 0.752 mm. The sheets are then cut into plaques of 5.08 cm×5.08 cm × 0.752 mm. The plaques are then oven aged at 80°C and color measurements made periodically using a Hunter Color Difference Meter Model D25. The polystyrene samples stabilized with the above stabilizer develops the undesirable yellow discoloration substantially later than the time that such discoloration occurred in the unstabilized samples.

EXAMPLE 11

Unstabilized linear polyethylene (HiFax 4401) is solvent blended in methylene chloride with 0.02% by weight of the substrate of 2,4,6-tris(3'-methyl-5'-tert-butyl-4'-hydroxybenzyl)-s-trithiane 1,1,3,3,5,5-hexaoxide and then vacuum dried. The resin is then extruded at 287.8°C using a 1.905 cm extruder having a 24:1 L/D ratio. The melt flow rate of a sample of the resin is determined after each extrusion according to ASTM test D-1238. Polyethylene stabilized with above compound is found to undergo less change in the melt flow rate than the unstabilized polyethylene.

What is claimed is:

1. A compound having the formula

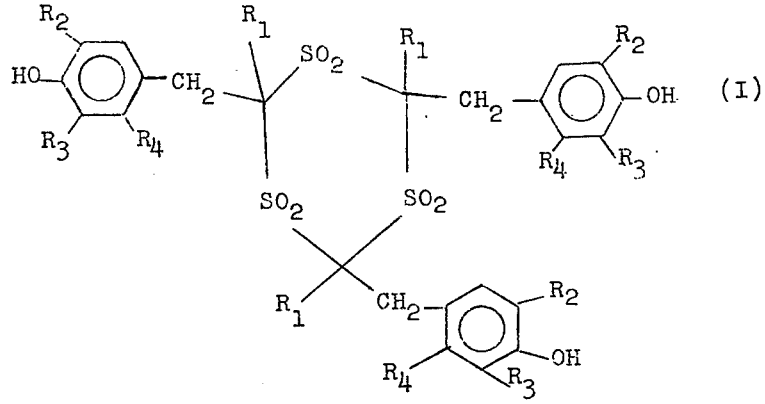

wherein
$R_1$ is independently hydrogen or alkyl of 1 to 18 carbon atoms,
$R_2$ and $R_3$ are the same or different alkyl groups of from 1 to 8 carbon atoms, cycloalkyl of from 5 to 6 carbon atoms or one of $R_2$ and $R_3$ is hydrogen, and
$R_4$ is hydrogen or lower alkyl of from 1 to 6 carbon atoms and providing that when $R_4$ is alkyl, $R_1$ is hydrogen.

2. A compound of claim 1 wherein
$R_1$ is hydrogen or lower alkyl of 1 to 6 carbon atoms,
$R_2$ and $R_3$ are methyl, isopropyl or tert-butyl, and
$R_4$ is hydrogen or methyl.

3. A compound of claim 1 wherein
R₁ is hydrogen or methyl,
R₂ is tert-butyl,
R₃ is methyl or tert-butyl, and
R₄ is hydrogen or methyl.

4. A compound claim 1 which is 2,4,6-tris(3',5'-di tert-butyl-4'-hydroxybenzyl)-s-trithiane 1,1,3,3,5,5-hexaoxide.

5. A compound of claim 1 which is 2,4,6-tris(3'-methyl-5'-tert-butyl-4'-hydroxybenzyl)-s-trithiane 1,1,3,3,5,5-hexaoxide.

6. A compound claim 1 which is 2,4,6-trimethyl-2,4,6-tris(3',5'-di-tert-butyl-4'-hydroxybenzyl)-s-trithiane 1,1,3,3,5,5-hexaoxide.

* * * * *